United States Patent [19]

Asawa et al.

[11] Patent Number: 4,610,764
[45] Date of Patent: Sep. 9, 1986

[54] ELECTROLYTIC CATION EXCHANGE MEMBRANE

[75] Inventors: Tatsuro Asawa; Haruhisa Miyake; Yoshio Sugaya, all of Yokohama, Japan

[73] Assignee: Asahi Glass Company Ltd., Tokyo, Japan

[21] Appl. No.: 735,714

[22] Filed: May 20, 1985

Related U.S. Application Data

[63] Continuation of Ser. No. 577,807, Feb. 7, 1984, abandoned.

[51] Int. Cl.$^4$ .......................... C25B 1/34; C25B 13/00
[52] U.S. Cl. ........................................ 204/98; 204/128; 204/252; 204/283; 204/296
[58] Field of Search ................. 204/98, 128, 252, 283, 204/296

[56] References Cited

U.S. PATENT DOCUMENTS

| | | | |
|---|---|---|---|
| 3,909,378 | 9/1975 | Walmsley | 204/296 |
| 4,021,327 | 5/1977 | Grot | 204/296 |
| 4,089,758 | 5/1978 | McAloon | 204/296 |
| 4,151,053 | 4/1979 | Seko et al. | 204/296 |
| 4,166,014 | 8/1979 | Sata et al. | 204/296 |
| 4,169,023 | 9/1979 | Sata et al. | 204/296 |
| 4,176,215 | 11/1979 | Molnar et al. | 204/296 |
| 4,204,938 | 5/1980 | Bachot | 204/296 |
| 4,255,523 | 3/1981 | Ukihashi et al. | 204/296 |
| 4,323,434 | 4/1982 | Yoshida et al. | 204/98 |
| 4,337,137 | 6/1982 | Ezzell | 204/296 |
| 4,349,422 | 9/1982 | Maloney | 204/296 |
| 4,457,822 | 4/1984 | Asano et al. | 204/252 |
| 4,486,277 | 12/1984 | Miyake et al. | 204/296 |

Primary Examiner—John F. Niebling
Assistant Examiner—Terryence Chapman
Attorney, Agent, or Firm—Oblon, Fisher, Spivak, McClelland & Maier

[57] ABSTRACT

An electrolytic cation exchange membrane which comprises a first film made of a fluorinated polymer having cation exchange groups and containing a fibrillated tetrafluoroethylene polymer and a second film laminated thereon, made of a fluorinated polymer having carboxylic acid groups as its ion exchange groups, said first film having a greater thickness and smaller specific electric resistance than said second film.

16 Claims, No Drawings

ELECTROLYTIC CATION EXCHANGE MEMBRANE

This application is a continuation of Ser. No. 577,807, filed Feb. 7, 1984, now abandoned.

BACKGROUND OF THE INVENTION

1. Field of the Invention:

The present invention relates to an electrolytic cation exchange membrane. More particularly, the present invention relates to a cation exchange membrane suitable for use in electrolysis of water or an aqueous solution such as an aqueous acidic or alkaline solution, an aqueous alkali metal halide solution or an aqueous alkali metal carbonate solution, and an electrolytic cell and electrolytic process wherein such a membrane is employed.

2. Description of the Prior Art:

As a process for producing an alkali metal hydroxide and chlorine by the electrolysis of the above-mentioned aqueous solution, particularly an aqueous solution of an alkali metal chloride, a diaphragm method has now been used in place of a mercury method with a view to preventing environmental pollution. Further, in order to efficiently obtain an alkali metal hydroxide having a high purity in a high concentration, it has been proposed and put into practical use to employ an ion exchange membrane.

On the other hand, from the standpoint of energy saving, it is desired to develop an ion exchange membrane which is capable of providing a high current efficiency and a low cell voltage and which has adequate mechanical strength. For this purpose, various membranes have been proposed. However, this object has not yet adequately been attained.

The present inventors have conducted extensive research with the aim of providing an ion exchange membrane whereby the electrolysis of an aqueous solution can be conducted with high efficiency and which has adequate mechanical strength, and as a result, have succeeded in the development of an ion exchange membrane which is capable of adequately attaining such an object.

THE SUMMARY OF THE INVENTION

The summary of the invention present invention provides an electrolytic cation exchange membrane which comprises a first film made of a fluorinated polymer having cation exchange groups and containing a fibrillated tetrafluoroethylene polymer and a second film laminated thereon, made of a fluorinated polymer having carboxylic acid groups as its ion exchange groups, said first film having a greater thickness and smaller specific electric resistance than said second film.

Such an ion exchange membrane of the present invention provides superior characteristics, i.e. a high current efficiency and a low cell voltage, in the electrolysis, and it has adequate mechanical strength.

In order to obtain a high current efficiency in the electrolysis of e.g. an alkali metal chloride, the electrolytic cation exchange membrane is usually required to have a relatively low ion exchange capacity, although the desired ion exchange capacity may vary depending upon the concentration of the alkali metal hydroxide to be produced. Such a relatively low ion exchange capacity means that the specific electric resistance is high, whereby the cell voltage will be high. Accordingly, it is not advisable to prepare the ion exchange membrane entirely from a fluorinated polymer having a low ion exchange capacity. For this reason, it has been proposed to prepare an ion exchange membrane by employing a combination of a fluorinated polymer having a low ion exchange capacity with a fluorinated polymer having a high ion exchange capacity and thus a small specific electric resistance.

However, when a plurality of thin films of a fluorinated polymer are laminated to form a membrane, it is usually difficult to obtain adequate mechanical strength without increasing the total thickness. That is because it is very difficult to reinforce thin films of a fluorinated polymer by conventional methods and a film of a fluorinated polymer having a high ion exchange capacity has usually poor mechanical strength. According to the present invention, a fibrillated tetrafluoroethylene polymer is incorporated for the reinforcement of the mechanical strength into the first film of a fluorinated polymer having a high ion exchange capacity and thus a low specific electric resistance and the second film having a low ion exchange capacity and thus a high specific electric resistance is made as thin as possible and laminated on the first film, whereby adequate mechanical strength can be imparted to the membrane without increasing the total thickness or without taking any special measure for the improvement of mechanical strength of the second film. Further, it has been found that when the above-mentioned fibrillated tetrafluoroethylene polymer is used, uniform and adequate reinforcement is obtainable and accordingly it is possible to increase the ion exchange capacity of the fluorinated polymer having a high ion exchange capacity to minimize the specific electric resistance, whereby it is possible to obtain an ion exchange membrane which is capable of minimizing the cell voltage.

In the present invention, the first film of the fluorinated polymer containing the fibrillated tetrafluoroethylene polymer should preferably be made to have an ion exchange capacity as high as possible so as to minimize the specific electric resistance. The cation exchange groups of the first film may be any groups such as sulfonic acid groups, carboxylic acid groups, phosphonic acid groups or hydroxyl groups. But sulfonic acid groups or carboxylic acid groups are preferred.

The content of the cation exchange groups in the first film is selected to have an ion exchange capacity of from 0.7 to 3.0 meq/g dry resin, preferably from 0.9 to 2.0 meq/g dry resin so that the specific electric resistance becomes to be lower than that of the second film which will be described hereinafter. In a case where weak acid groups such as carboxylic acid groups or phosphoric acid groups are used as the cation exchange groups, an ion exchange capacity higher than that of the second film is employed.

Various kinds of fluorinated polymers may be used for the preparation of the first film. Among them, polymers having the following repeating units (a) and (b) are preferably used.

(a) $\mathrm{+CF_2-CXX'+}$ (b) 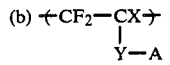

where X and X' is —F, —Cl, —H or —CF$_3$, A is —SO$_3$M, —COOM or —PO$_3$M$_2$ (where M is hydrogen or an alkali metal or a group hydrolyzable to such a group), and Y is selected from the group consisting of $-(CF_2)_x-$, $-O-(CF_2)_x-$,

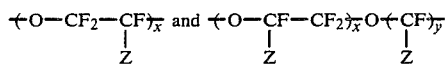

where Z is —F or a perfluoroalkyl group having from 1 to 10, preferably 1 to 5, carbon atoms, and each of x and y is an integer of from 1 to 10, preferably 1 to 5.

The molar ratio of units (a)/units (b) is selected to provide a fluorinated polymer having an ion exchange capacity within the above-mentioned range. The fluorinated polymers are preferably perfluoro polymers. Preferred perfluoro polymers include a copolymer of $CF_2=CF_2$ and $CF_2=CFOCF_2CF(CF_3)OCF_2CF_2SO_2F$, a copolymer of $CF_2=CF_2$ and $CF_2=CFO(CF_2)_{1-5}SO_2F$, a copolymer of $CF_2=CF_2$ and $CF_2=CFO(CF_2)_{1-5}COOCH_3$ and a copolymer of $CF_2=CF_2$ and $CF_2=CFOCF_2CF(CF_3)OCF_2CF_2COOCH_3$.

As mentioned above, a fibrillated tetrafluoroethylene polymer is incorporated in the fluorinated polymer for the first film. The fibrillated tetrafluoroethylene polymer may be a tetrafluoroethylene polymer including any modified tetrafluoroethylene which is capable of forming a branched or web-like three-dimensional network structure when subjected to a shearing force to fibrillate. Such a tetrafluoroethylene polymer may be a so-called fine powder obtained by emulsion polymerization or a so-called molding powder obtained by suspension polymerization. Among them, it is preferred to employ a powder having a surface area of from 3 to 30 m²/g, more preferably from 6 to 20 m²/g. The tetrafluoroethylene polymer may be a homopolymer of tetrafluoroethylene or a copolymer of tetrafluoroethylene containing preferably at most 5 molar % of a monomer exemplified by the formula:

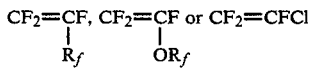

where $R_f$ is a perfluoroalkyl group having from 1 to 10 carbon atoms, as the comonomer unit.

The molecular weight of the tetrafluoroethylene polymer used in the present invention is not critical. However, from the viewpoint of the reinforcing effect, the molecular weight is preferably at least 2,000,000.

The amount of the fibrillated tetrafluoroethylene polymer to be incorporated in the first film of the fluorinated polymer may vary depending upon the mechanical strength desired which differs depending upon the ion exchange capacity of the fluorinated polymer. But it is usually preferred to incorporate the fibrillated fluoroethylene polymer in an amount of from 0.5 to 15% by weight, more preferably from 0.8 to 8% by weight, based on the total amount of the first film. If the amount is too small, no adequate improvement of the mechanical properties will be obtained. On the other hand, if the amount exceeds the above range, there will be drawbacks such as the formation of bubbles in the membrane during the electrolysis or deterioration in the fabricability into a film.

Various methods may be employed for the incorporation of the fibrillated tetrafluoroethylene polymer into the film for the cation exchange membrane. However, from the viewpoints of the operability, the economy and the properties of the cation exchange membrane obtained, it is preferred to employ a method wherein the non-fibrillated polymer is mixed with the film-forming fluorinated polymer and a shearing stress is applied during or after the mixing operation to fibrillate the polymer. The fibrillation is conducted by exerting a shearing stress to the tetrafluoroethylene polymer, e.g. by subjecting the mixture containing the tetrafluoroethylene polymer to roll kneading. For the fibrillation, it is possible to employ a mixing or kneading method commonly used for mixing or kneading plastics, such as kneading between a pair of rolls, kneading by means of a Bumbury's mixer or kneading by means of a monoaxial or biaxial extruder. The shearing stress is preferably at least $10^5$ dyn/cm, the shear rate is preferably at least $0.1 \text{ sec}^{-1}$, and the temperature is preferably at least 70° C., more preferably at least 100° C. and at most the melting point of the tetrafluoroethylene polymer. The time for the mixing or kneading is not critical, but is usually from 1 minute to 1 hour.

The mixing of the tetrafluoroethylene polymer with the film-forming fluorinated polymer may be conducted at the same time as the fibrillation of the tetrafluoroethylene polymer, or the two polymers may be preliminalily mixed by dry mixing or wet mixing and the mixture thereby obtained is kneaded between a pair of rolls for fibrillation of the tetrafluoroethylene polymer. If necessary, after the fibrillation, the film may be subjected to heat treatment at a temperature of not higher than the melting point of the tetrafluoroethylene polymer to remove the internal strain.

By the incorporation of the fibrillated tetrafluoroethylene polymer into the first film, the tensile strength, the bending strength, the abrasion resistance and the anti-edge tear strength of the membrane thereby obtained will be remarkably improved. Further, according to the present invention, the tear strength and stiffness of the membrane can further be improved by incorporating a woven or non-woven fabric, such as a cloth or a net, of a fluorinated polymer in addition to the fibrils. Such a woven or non-woven fabric may be made of a fluorinated polymer which is the same or similar to the one constituting the fibrils. The thickness and the mesh size of the woven or non-woven fabric are preferably from 50 to 500 μm and from 15 to 50 mesh respectively. The woven or non-woven fabric may be incorporated into the first film under pressure and heating prior to or subsequent to the lamination of the first film with the second film.

In the present invention, various fluorinated polymers may be used as the fluorinated polymer for the second film which has carboxylic acid groups as the ion exchange groups. Among them, it is preferred to use polymers having the following repeating units (A) and (B).

(A) $-(CF_2-CXX')-$ (B) 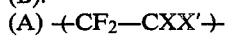

Where X, X', Y and M are as defined above. Among them, perfluoro copolymers are preferred. For instance, there may be mentioned a copolymer of $CF_2=CF_2$ and $CF_2=CFO(CF_2)_{1-5}COOCH_3$ or a copolymer of $CF_2=CF_2$ and 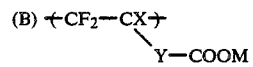

In order to maximize the performance of the ion exchange membrane by the combination of the first and second films of fluorinated polymers according to the present invention, the first film is preferably made to have a thickness of from 50 to 500 μm and the second film is preferably made to have a thickness of from 5 to 50 μm, and the ratio of the thickness of the first film to the thickness of the second film is preferably selected to be from 2 to 50, more preferably from 5 to 20.

In the present invention, it is preferred that the second film is very thin, as mentioned above. Accordingly, the reinforcing material is usually introduced to the first film only. However, in some cases, it is also possible to incorporate a fibril or a woven or non-woven fabric of a fluorinated polymer into the second film.

For the lamination of the first and second films, an optional method may be employed, and in any case, the two films must be integrated by the lamination. For instance, the lamination is carried out by pressing or coextruding them preferabaly at a temperature of from 100 to 350° C. under pressure of from 0.5 to 100 kg/cm$^2$. In the present invention, in some cases, two or more different kinds of films may be used for the first film or the second film or for both the first and second films for the lamination. When these films are laminated, the respective cation exchange groups should take a suitable form not to lead to decomposition thereof. For instance, in the case of carboxylic acid groups, they should preferably take a form of an acid or an ester at the time of lamination, and in the case of sulfonic acid groups, they should preferably take a form of —SO$_2$F at the time of lamination. The thickness of the cation exchange membrane obtained by the lamination is preferably from 80 to 500 μm, more preferably from 100 to 300 μm.

The cation exchange membrane of the present invention thus obtained by the lamination of the first and second films, exhibits superior performance by itself. However, if desired, a gas and liquid permeable porous layer comprising catalytically active particles (see, U.S. Pat. No. 4,224,121, etc.) or a gas and liquid permeable porous layer comprising catalytically inactive particles (see, U.S. patent application Ser. No. 205,567 by the same assignee as the assignee of the present application, U.K. Published Patent Application No. 2,064,586, etc.) may be provided on one side or both sides of the membrane to further improve its performance.

The cation exchange membrane of the present invention is useful for the electrolysis of various aqueous solutions, particularly an aqueous alkali metal chloride solution as mentioned above. For instance, when used for the electrolysis of an aqueous alkali metal chloride solution, the cation exchange membrane of the present invention is disposed so that the first film faces the anode side and the second film faces the cathode side, whereby the cation exchange membrane of the present invention exhibits the maximum performance.

The electrolysis of an aqueous alkali metal chloride solution with use of the cation exchange membrane of the present invention, may be conducted under such known conditions as disclosed in the above-mentioned U.S. Pat. Nos. 4,367,126 and 4,319,969, etc. For instance, while supplying an aqueous alkali metal hydroxide solution of preferably from 2.5 to 5.0N to the anode compartment and water or a diluted alkali metal hydroxide to the cathode compartment, the electrolysis is conducted preferably at a temperature of from 80° to 120° C. at a current density of from 10 to 100 A/dm$^2$. In such electrolysis, it is advisable to minimize heavy metal ions such as calcium or magnesium in the aqueous alkali metal chloride solution, as such heavy metal ions tend to lead to degradation of the cation exchange membrane. Further, in order to minimize the generation of oxygen at the anode, an acid such as hydrochloric acid may be added to the aqueous alkali metal chloride solution.

The electrolytic cell used in the present invention may be a monopolar or bipolar type so long as it has the above-mentioned structure. The electrolytic cell used in the electrolysis of an aqueous solution of an alkali metal chloride, is made of a material being resistant to the aqueous solution of the alkali metal chloride and chlorine such as valve metal like titanium in the anode compartment and is made of a material being resistant to an alkali metal hydroxide and hydrogen such as iron, stainless steel or nickel in the cathode compartment.

When the electrodes are placed in the electrolytic cell of the present invention, they may be disposed to contact the ion exchange membrane, or they may be placed with an appropriate space from the ion exchange membrane.

In the foregoing, the use of the membrane of the present invention has been described primarily with respect to the electrolysis of an aqueous alkali metal chloride solution. However, it should be understood that the membrane of the present invention is likewise applicable to the electrolysis of water, a halogen acid (hydrochloric acid or hydrobromic acid) or an alkali metal carbonate.

Now, the present invention will be described with reference to Examples which are provided for the purpose of illustration and are not intended to limit the present invention.

EXAMPLE 1

Into a 0.2 stainless steel pressure reactor, 100 g of deionized water, 0.2 g of $C_8F_{17}COONH_4$, 0.50 g of $Na_2HPO_4 \cdot 12H_2O$, 0.29 g of $NaH_2PO_4 \cdot 2H_2O$, 0.079 g of $(NH_4)_2S_2O_8$ and 0.04 g of $NaHSO_4$ were fed, and then 30 g of $CF_2=CFO(CF_2)_3COOCH_3$ was fed. After thoroughly deaerating with liquid nitrogen, the temperature was raised to 40° C., and 5.1 kg/cm$^2$ of tetrafluoroethylene was introduced and reacted. During the reaction, tetrafluoroethylene was continuously introduced into the system to maintain the pressure at 5.1 kg/cm$^2$. 7.5 Hours later, the reaction was terminated and the obtained latex was coagulated by means of concentrated sulfuric acid. The polymer thereby obtained was thoroughly washed with water, then treated in methanol at 65° C. for 16 hours and dried to obtain 23.4 g of a copolymer having an ion exchange capacity of 1.80 meq/g. To the copolymer, 5.5% by weight of PTFE particles (Teflon 6J) were added, and the mixture was kneaded at 130° C. by kneading rolls to fibrillate PTFE and then pressed at 230° C. to form a film having a thickness of 200 μm.

Into 0.2 l stainless steel pressure reactor, 100 g of deionized water, 0.2 g of $C_8F_{17}COONH_4$, 0.49 g of $NaH_2PO_4 \cdot 2H_2O$, 0.052 g of $(NH_4)_2S_2O_8$ and 0.017 g of isopropanol were fed, and then 20 g of $CF_2=CFO(CF_2)_3COOCH_3$ was fed. After deaerating with liquid nitrogen, the temperature was raised to 60° C., and 14.5 kg/cm$^2$ of tetrafluoroethylene was introduced and reacted. During the reaction, tetrafluoroethylene was introduced into the system to maintain the pressure at 14.5 kg/cm$^2$. 6 Hours later, the reaction was terminated, and the obtained latex was treated in the same manner as above, whereby 19.6 g of a polymer having an ion exchange capacity of 1.25 meq/g was obtained. The polymer was pressed at 230° C. to form a thin film having a thickness of 30 μm.

Then, the two types of films were laminated at 190° C. by means of rolls to obtain a double-layered membrane. The membrane was hydrolyzed at 90° C. for 16 hours in an aqueous solution containing 25% by weight of sodium hydroxide.

Then, a two compartment electrolytic cell was formed by partitioning an anode and a cathode with such a cation exchange membrane so that the layer having a higher ion exchange capacity faces the anode side and the layer having a lower ion exchange capacity faces the cathode side. Electrolysis of sodium chloride was conducted under the following conditions by using a $RuO_2/Ti$ expanded metal as the anode and an active nickel/Fe expanded metal as the cathode and with an electrode distance of 3 mm. Namely, the electrolysis was carried out at 90° C. under a current density of 20 $A/dm^2$ at a pH of the anolyte of 3 while supplying a 4N NaCl aqueous solution to the anode compartment. As the results, the cell voltage was 3.07 V and the current efficiency was 95.0% when the concentration of the formed sodium hydroxide was 35% by weight.

EXAMPLE 2

Into a 2 l stainless steel pressure reactor, 1000 g of $CF_2=CFO(CF_2)_3COOCH_3$ and 0.4 g of diisopropyl peroxydicarbonate were fed. After thoroughly deaerating with liquid nitrogen, the temperature was raised to 40° C., and 6.7 $kg/cm^2$ of tetrafluoroethylene was introduced and reacted. 10.5 Hours later, the reaction was terminated, and the obtained slurry was diluted with trichlorotrifluoroethane. Then, the polymer was precipitated in carbon tetrachloride. After the reprecipitation, the precipitate was dried at 65° C. for 16 hours to obtain 146 g of a copolymer having an ion exchange capacity of 1.91 meq/g. To the copolymer, 9% by weight of PTFE particles (Teflon 6J) were added, and the mixture was kneaded at 130° C. by kneading rolls to fibrillate PTFE and then pressed at 230° C. to form a film having a thickness of 200 μm. Onto this film, the polymer film obtained in Example 1, having an ion exchange capacity of 1.25 meq/g and a thickness of 30 μm was laminated.

Then, a paste was prepared by kneading a mixture comprising 10 parts by weight of zirconium oxide having an average particle size of 7 μm, 1 part by weight of PTFE particles, 0.3 part by weight of methyl cellulose (a 2% aquedus solution), 14 parts by weight of water, 2 parts by weight of cyclohexanol and 1 part by weight of cyclohexanone. The paste was applied by screen printing to one side of the above laminated membrane (i.e. on the polymer layer having an ion exchange capacity of 1.91 meq/g), then dried and solidified to obtain a deposition of 1.0 $mg/cm^2$. Then, a paste prepared in the same manner as above except that silicon carbide having an average particle size of 2 μm was used, was applied on the other side of the laminated membrane (i.e. on the polymer layer having an ion exchange capacity of 1.25 meq/g), then dried and solidified to obtain a deposition of 0.98 $mg/cm^2$. The membrane was hydrolyzed in an aqueous solution containing 25% by weight of sodium hydroxide, and then used for the electrolysis in the same manner as in Example 1. Sodium hydroxide having a concentration of 35% by weight was obtained at a current efficiency of 94% and at a cell voltage of 2.8 V.

EXAMPLE 3

Into a 0.2 l stainless steel pressure reactor, 70 g of

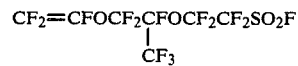

and 0.11 g of diisopropylperoxydicarbonate were fed. After thoroughly deaerating with liquid nitrogen, the temperature was raised to 40° C., and 9.3 $kg/cm^2$ of tetrafluoroethylene was introduced and reacted. 4 Hours later, 11.5 g of a copolymer having an ion exchange capacity of 1.14 meq/g was obtained. To this copolymer, 6% by weight of PTFE particles were added and fibrillated by kneading rolls, and the mixture was pressed at 230° C. to form a film having a thickness of 150 μm. Onto this film, the film made of a copolymer of tetrafluoroethylene with $CF_2=CFO(CF_2)_3COOCH_3$ obtained in Example 1, having an an ion exchange capacity of 1.25 meq/g and a thickness of 30 μm, was laminated at 190° C. by means of rolls. The laminated membrane was hydrolyzed at 90° C. for 16 hours in an aqueous solution containing 25% by weight of sodium hydroxide, to obtain an ion exchange membrane. The electrolysis was conducted in the same manner as in example 1. Sodium hydroxide having a concentration of 35% by weight was obtained at a current efficiency of 95% and at a cell voltage of 3.08 V.

EXAMPLE 4

PTFE cloth (39 mesh×34 mesh woven cloth by 300 denier PTFE filament) was incorporated at 190° C. by means of rolls in the 1.80 meq/g layer of the same laminated membrane as in Example 1. The membrane was hydrolyzed at 90° C. for 16 hours in an aqueous solution containing 25 weight % by weight of sodium hydroxide. Then, the electrolysis was conducted in the same manner as in Example 1. Sodium hydroxide having a concentration of 35% by weight was obtained at a current efficiency of 95% and at a cell voltage of 3.13 V.

EXAMPLE 5

Both surfaces of the same laminated membrane as in Example 1 were roughened with a sand paper so as to have coase regions of 1 to 5 microns depth. Then, the membrane was hydrolyzed at 90° C. for 16 hours in a 25 weight % caustic solution. The electrolysis was conducted in the same manner as in Example 1. Sodium hydroxide having a concentration of 35% by weight was obtained at a current efficiency of 94% and at a cell voltage of 2.98 V.

We claim:

1. An electrolytic cation exchange membrane which comprises a first film made of a fluorinated polymer having the following repeating units (a) and (b):

(a) —(CF$_2$—CXX′)—

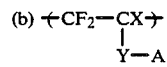

wherein:
X and X′ is —F, —Cl, —H or —CH$_3$;

A is —COOM or —PO₃M₂, wherein M is hydrogen, an alkali metal or a group hydrolyzable to such a group; and Y is selected from the group consisting of —(CF$_2$)$_x$—, —O—(CF$_2$)$_x$—, $$-(O-CF_2-CF)_x- \text{ and } -(O-CF-CF_2)_x-O-(CF)_y-;$$
$$\qquad\qquad | \qquad\qquad\qquad\qquad | \qquad\qquad\quad |$$
$$\qquad\qquad Z \qquad\qquad\qquad\qquad Z \qquad\qquad\quad Z$$

wherein

Z is —F or a perfluoroalkyl group having from 1 to 10 carbon atoms; and each of x and y is an integer of from 1 to 10, and containing a fibrillated tetrafluoroethylene polymer, and a second film laminated thereon, made of a fluorinated polymer having carboxylic acid groups as its ion exchange groups;

said first film having a greater thickness and smaller specific electric resistance than said second film.

2. The electrolytic cation exchange membrane according to claim 1, wherein the first film has a thickness of from 50 to 500 μm, the second film has a thickness of from 5 to 50 μm and the ratio of the thickness of the first film to the thickness of the second film is within a range of from 2 to 50.

3. The electrolytic cation exchange membrane according to claim 1, wherein the first film has a thickness of at least 50 μm and contains from 3 to 15% by weight of the fibrillated tetrafluoroethylene polymer.

4. The electrolytic cation exchange membrane according to claim 1, wherein the fibrillated tetrafluoroethylene polymer is fibrils of emulsion-polymerized tetrafluoroethylene having a specific surface area of from 3 to 30 m²/g.

5. The electrolytic cation exchange membrane according to claim 1, wherein the fibrillated tetrafluoroethylene polymer is fibrils of a tetrafluoroethylene copolymer containing at most 5 molar % of a monomer represented by the formula:

$$CF_2=CF, \; CF_2=CF \text{ or } CF_2=CFCl$$
$$\quad\; | \qquad\qquad | $$
$$\quad\; R_f \qquad\quad\; OR_f$$

where R$_f$ is a perfluoroalkyl group having from 1 to 10 carbon atoms, as the comonomer unit.

6. The electrolytic cation exchange membrane according to claim 1, wherein the first film contains a reinforcing material composed of a woven or nonwoven fabric of a fluorinated polymer.

7. The electrolytic cation exchange membrane according to claim 6, wherein the woven or non-woven fabric has a thickness of from 50 to 500 μm and a mesh size of from 15 to 50 mesh.

8. The electrolytic cation exchange membrane according to claim 1, wherein the cation exchange groups of the first film are carboxylic acid groups, and the first film has a greater ion exchange capacity than the second film.

9. The electrolytic cation exchange membrane according to claim 1, wherein a gas and liquid permeable porous layer composed of catalytically active particles is provided on one side or both sides of the membrane.

10. The electrolytic cation exchange membrane according to claim 1, wherein a gas and liquid permeable porous layer composed of catalytically inactive particles is provided on one side or both sides of the membrane.

11. The electrolytic cation exchange membrane according to claim 1, wherein at least one side of the membrane has a roughened surface.

12. An electrolytic cell which comprises anode and cathode compartments partitioned by an electrolytic cation exchange membrane as defined in claim 1.

13. The electrolytic cell according to claim 12, wherein the electrolytic cation exchange membrane is disposed so that the first film faces the anode side and the second film faces the cathode side.

14. The electrolytic cell according to claim 12, wherein an aqueous alkali metal chloride solution is electrolyzed to obtain an alkali metal hydroxide and chlorine.

15. An electrolytic process which comprises electrolyzing an aqueous alkali metal chloride solution in the electrolytic cell as defined in claim 14, at a temperature of from 80° to 120° C. and at a current density of from 10 to 100 A/dm² while supplying a 2.5–5.0N alkali metal chloride aqueous solution to the anode compartment and water or a dilute alkali metal hydroxide aqueous solution to the cathode compartment.

16. An electrolytic cation exchange membrane which consists of a first film made of a fluorinated polymer having the following repeating units (a) and (b):

(a) —(CF$_2$—(CXX')—

(b) ─(CF$_2$—CX)─
$\qquad\qquad\quad |$
$\qquad\qquad\; Y—A$ wherein:

X and X' independently represent —F, —Cl, —H or CH₃;

A is —COOM or —PO₃M₂, wherein M is hydrogen, an alkali metal ion, or a group hydrolyzable to an alkali metal ion; and Y is selected from the group consisting of —(CF$_2$)$_x$—, —O—(CF$_2$)$_x$—, $$-(O-CF_2-CF)_x- \text{ and } -(O-CF-CF_2)_x-O-(CF)_y-;$$
$$\qquad\qquad | \qquad\qquad\qquad\qquad | \qquad\qquad\quad |$$
$$\qquad\qquad Z \qquad\qquad\qquad\qquad Z \qquad\qquad\quad Z$$

wherein

Z is —F or a perfluoroalkyl group having from 1 to 10 carbon atoms; and each of x and y is an integer of from 1 to 10, wherein said first film contains a fibrillated tetrafluoroethylene polymer, and a second film laminated thereon, made of a fluorinated polymer having carboxylic acid groups as its ion exchange groups;

said first film having a greater thickness and smaller specific electric resistance than said second film wherein said first film has a thickness of from 50 to 500 μm, said second film has a thickness of from 5 to 50 μm, and the ratio of the thickness of said first film to the thickness of said second film is within a range of from 2 to 50.

* * * * *